W. P. PARSONS.
GLASSWARE.
APPLICATION FILED MAY 27, 1914. RENEWED SEPT. 8, 1915.

1,199,603.

Patented Sept. 26, 1916.

UNITED STATES PATENT OFFICE.

WILLIAM P. PARSONS, OF CORNING, NEW YORK, ASSIGNOR TO CORNING GLASS WORKS, A CORPORATION OF NEW YORK.

GLASSWARE.

1,199,603.  Specification of Letters Patent.  Patented Sept. 26, 1916.

Application filed May 27, 1914, Serial No. 841,294. Renewed September 8, 1915. Serial No. 49,647.

*To all whom it may concern:*

Be it known that I, WILLIAM P. PARSONS, a citizen of the United States of America, and a resident of the city of Corning, State of New York, have invented certain new and useful Improvements in Glassware, of which the following is a specification.

My invention relates to certain peculiar shaping of the internal contour of a transparent vessel whereby the optical effect is produced of a vessel which has its external wall in the form of facets or flat faces, whereas, as a matter of fact, such wall may be perfectly smooth and rounded. The utility of this structure will be obvious when it is remembered that external facets, while liable to chip on the corners, are in spite of this objection used on account of the artistic effect produced thereby.

With my improved form the artistic effect is produced and the liability of chipping is obviated, in that there are no external angles or projections to be broken away. In addition to this optical effect my structure as illustrated in the embodiment shown in the accompanying drawings, produces further optical effects, as will be hereinafter described.

Figure 1:
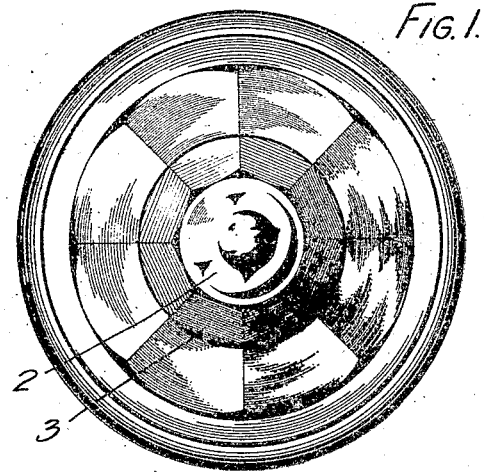
Figure 2:
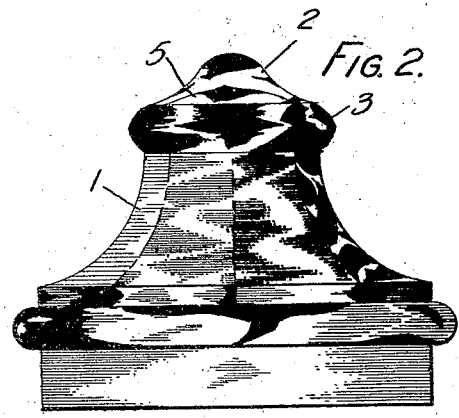
Figure 3:
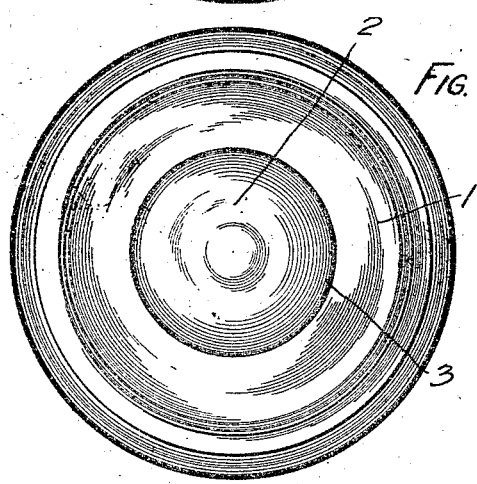
Figure 4:
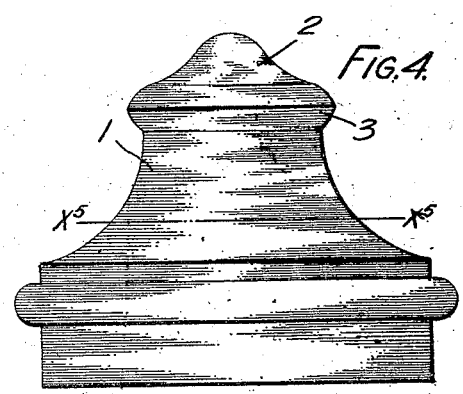
Figure 5:
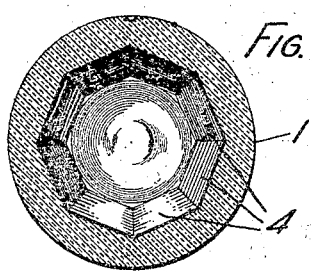
Figure 6:
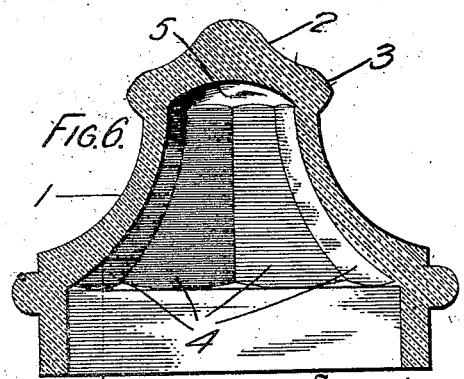

Referring to the accompanying drawings, in which corresponding parts are designated by corresponding marks of reference,—Figure 1 is a plan view of a vessel cover having my invention applied thereto as the same appears to the eye. Fig. 2 is a side elevation thereof, also showing the optical effect produced. Fig. 3 is a plan view of the cover illustrated optically in Fig. 1, but showing merely the external configuration. Fig. 4 is a view made according to the manner in Fig. 3, and in side elevation. Fig. 5 is a horizontal section taken through the cover shown in the above figures on the lines $X^5$, $X^5$ of Fig. 4, and Fig. 6 is a central diametrical section thereof.

Referring now to the configuration, it will be noted that in the form of cover shown the exterior surface 1 is in its vertical contour concave, and in horizontal section is circular, it being surmounted at 2, at the base of which is a bead 3, the dome wall being also concaved in vertical section. The interior wall of the cover consists of a series of faces 4 which, while in vertical section are at a practically uniform distance from the external wall 1, may separate therefrom slightly at the base, as shown, the upper part of the walls terminating in a concave wall 5 which, in the embodiment shown, is within the horizontal plane of the bead 3.

Optically, the effect produced by the internal and external configuration here described is shown in Figs. 1 and 2, from which it will be seen that in plan and side elevation the article appears to have a series of external faces and that, furthermore, the wall 5 of the central recess appears, due to refraction in the glass, to be located well up within the dome 2, giving an air of lightness to an otherwise heavy part, while permitting the ready formation of this article by pressing.

Having thus described my invention, what I claim and desire to secure by Letters Patent is:

1. A new and improved article of manufacture of a glass, the exterior wall of which in one cross section is circular and which in a cross section at right angles is concaved and the interior surface of which in the first cross section is polygonal and which in the other cross section follows substantially the contour of the outer surface.

2. As a new and improved article of manufacture, a vessel cover made of transparent material, having an exterior wall curved in horizontal section, and in vertical section comprising concaved base walls, a dome with concaved side walls and an enlarged ring at the base of the dome, the vessel on its interior being polygonal in horizontal cross section adjacent to the external base walls, the interior of the cover terminating in a wall located within the enlarged ring, substantially as described.

3. As a new and improved article of manufacture, a vessel cover made of transparent material comprising a hollow tapered base surmounted by a dome, a thickened exterior refracting bead located at the junction of the base and dome, the interior cavity of the base terminating in a concave top wall located within the plane of the thickened bead.

In testimony whereof I have hereunto set my hand in presence of two witnesses.

WILLIAM P. PARSONS.

In presence of—
F. F. SHETTERLY,
WILLIAM CHURCHILL.